(12) United States Patent
Yu et al.

(10) Patent No.: US 8,680,980 B2
(45) Date of Patent: Mar. 25, 2014

(54) BLANK TIRE PRESSURE MONITORING DEVICE AND ITS SETUP METHOD

(75) Inventors: San-Chuan Yu, Changhua County (TW); Chih-Ming Chiang, Kaohsiung (TW); Yuan-Tung Hung, Changhua County (TW); Chao-Ching Hu, Tainan County (TW)

(73) Assignee: Cub Elecparts Inc., Changhua County (TW)

( * ) Notice: Subject to any disclaimer, the term of this patent is extended or adjusted under 35 U.S.C. 154(b) by 142 days.

(21) Appl. No.: 13/036,419

(22) Filed: Feb. 28, 2011

(65) Prior Publication Data
US 2012/0218096 A1 Aug. 30, 2012

(51) Int. Cl.
*B60C 23/00* (2006.01)

(52) U.S. Cl.
USPC ........... 340/442; 340/443; 340/444; 340/445; 340/446; 340/447; 340/448; 73/146.2; 73/146.3; 73/146.4; 73/146.5; 73/146.8

(58) Field of Classification Search
CPC ............ B60C 23/0471; B60C 23/0472; B60C 23/0479
USPC .......... 340/426.33, 447, 442; 73/146.3, 146.5
See application file for complete search history.

(56) References Cited

U.S. PATENT DOCUMENTS

| 4,553,000 | A | * | 11/1985 | Appleton ................... 200/50.29 |
| 5,562,787 | A | * | 10/1996 | Koch et al. ...................... 156/64 |
| 5,731,754 | A | * | 3/1998 | Lee et al. ........................ 340/447 |
| 6,016,102 | A | * | 1/2000 | Fortune et al. ................. 340/442 |
| 6,059,605 | A | * | 5/2000 | Robinson et al. ............. 439/517 |
| 6,888,450 | B2 | * | 5/2005 | Sasaki et al. .................. 340/445 |
| 6,920,785 | B2 | | 7/2005 | Toyofuku |
| 7,187,272 | B2 | * | 3/2007 | Katou ........................... 340/442 |
| 7,414,521 | B2 | * | 8/2008 | Jost ................................ 340/442 |
| 2002/0014115 | A1 | * | 2/2002 | Young et al. .................... 73/146 |
| 2004/0206167 | A1 | * | 10/2004 | Pacsai et al. .................... 73/146 |
| 2006/0272402 | A1 | * | 12/2006 | Yin et al. ..................... 73/146.8 |
| 2008/0074249 | A1 | * | 3/2008 | Cheng et al. .................. 340/445 |
| 2008/0094198 | A1 | * | 4/2008 | Yu ................................. 340/447 |

(Continued)

OTHER PUBLICATIONS

Harris, Inga; "The Newest S08/RS08 Tool; New breed of SPYDER discovered;" Summer 2007; Freescale Semiconductor; Beyond Bits; Issue 2, pp. 36-40.*
Lenzen, Rudi; "MPXY8300 Design Reference Manual;" Dec. 2008; pp. 1-54.*
Freescale Semiconductor; "Product Specification Tire Pressure Monitor Sensor Product Specification;" May 2009; pp. 1-164.*
Gauthier, Laurent; "Designing with MC33596/MC33696 A Step-by-Step Approach for a Reference Design;" Apr. 2007; pp. 1-33.*
Freescale Semiconductors; "MC68HC908JB16 Technical Data;" Aug. 1, 2005; pp. 1-13.*

*Primary Examiner* — Amare Megistu
*Assistant Examiner* — Crystal A Mathews
(74) *Attorney, Agent, or Firm* — Muncy, Geissler, Olds & Lowe, P.C.

(57) ABSTRACT

A blank tire pressure monitoring device includes a housing having an air valve at one end and connection terminals at an opposite end, a circuit board mounted in the housing and carrying a pressure sensor, a temperature sensor, an acceleration sensor, an analog-digital converter electrically connected with the pressure sensor, the temperature sensor and the acceleration sensor, a general purpose I/O terminal unit electrically connected with the connection terminals of the housing; an embedded microcontroller module electrically connected with the general purpose I/O terminal unit and the analog-digital converter and having built therein a flash memory, a microcontroller core and a special-function register controller, a LF receiver electrically connected to the embedded microcontroller module, and a transmitter electrically connected to the embedded microcontroller module; and a method is still also disclosed for setting up a blank tire pressure monitoring device.

16 Claims, 6 Drawing Sheets

(56) References Cited

U.S. PATENT DOCUMENTS

| | | |
|---|---|---|
| 2008/0117037 A1* | 5/2008 | Kenny et al. .................. 340/447 |
| 2008/0164846 A1* | 7/2008 | DeKeuster et al. ........... 320/115 |
| 2008/0164988 A1* | 7/2008 | DeKeuster et al. ........... 340/442 |
| 2010/0188932 A1* | 7/2010 | Hanks et al. .................. 367/140 |
| 2012/0112898 A1* | 5/2012 | Yu et al. ........................ 340/442 |
| 2012/0222477 A1* | 9/2012 | Yu et al. .......................... 73/146 |
| 2012/0289071 A1* | 11/2012 | Dodds et al. .................. 439/183 |

* cited by examiner

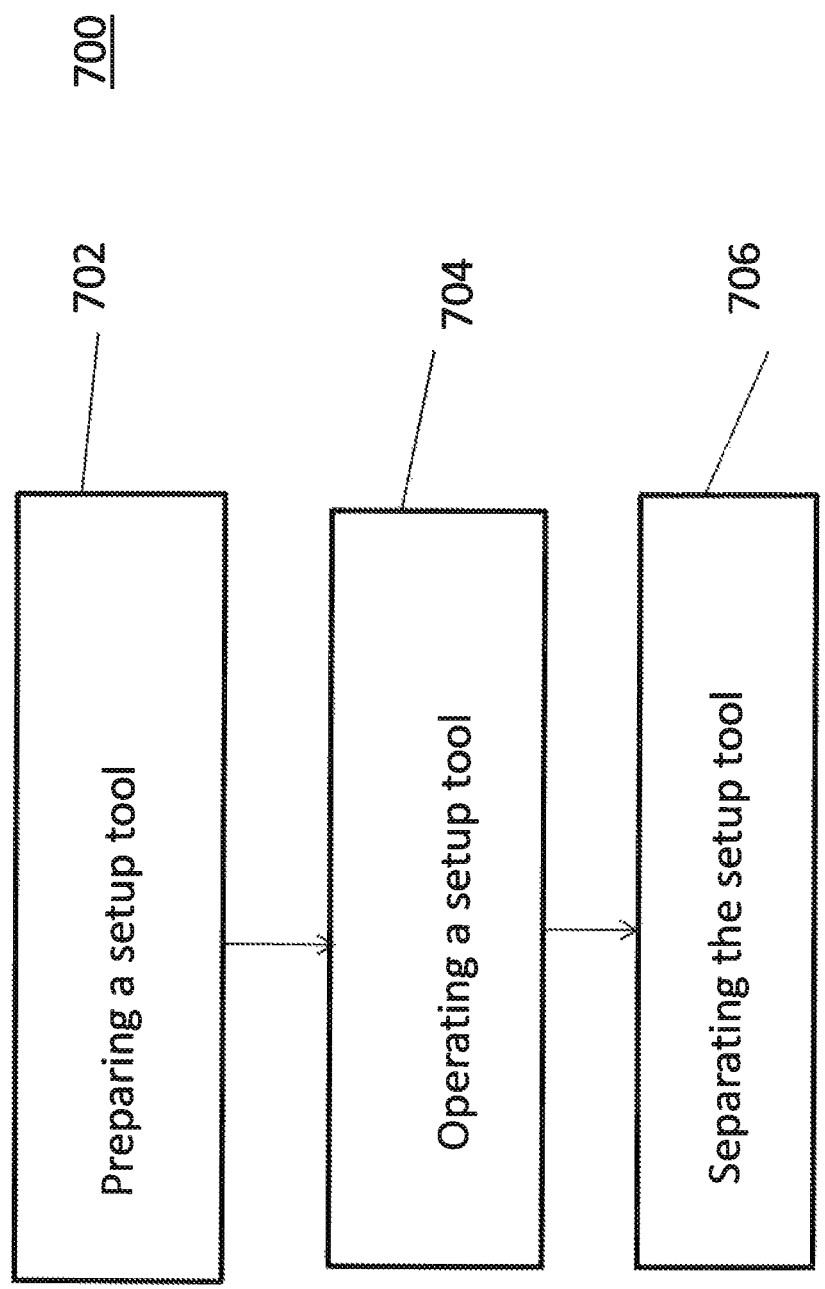

BLANK TIRE PRESSURE MONITORING DEVICE AND ITS SETUP METHOD

BACKGROUND OF THE INVENTION

1. Field of the Invention

The present invention relates to vehicle tire pressuring monitoring technology and more particularly, to a blank tire pressure monitoring device. The invention relates also to a method for setting the blank tire pressure monitoring device.

2. Description of the Related Art

In order to know the car condition and to assure a safety driving, tire pressure monitoring means will be installed to monitor the tire pressure and temperature and to provide the monitored data to the driver for reference. The communication program in a regular tire pressure monitoring device was directly programmed therein during the fabrication of the tire pressure monitoring device. However, it may take a long period of time or several methods after the fabrication of a tire pressure monitoring device and before installation of the tire pressure monitoring device in a vehicle tire for application. During this period, the program programmed in the tire pressure monitoring device is not changeable. When a new edition of communication program is issued after the fabrication of a tire pressure monitoring device and before installation of the tire pressure monitoring device in a vehicle tire, the tire pressure monitoring device cannot use this new edition.

Further, U.S. Pat. No. 6,920,785 discloses a tire pressure sensor unit and a method of registering identification code of tire pressure sensor unit. The disclosure teaches rewriting data of self-identification code so that a new tire pressure sensor unit can use the identification code of an old tire pressure sensor unit. However, this invention is not practical due to the following few questions. At first, when the user is going to rewrite the identification code, it is because the old tire pressure sensor unit is failed. However, how can a damaged tire pressure sensor unit transmit its identification code to a new tire pressure sensor unit by a wireless method? Further, the ROM in the cited case is another question. As the ROM (read only memory) does not allow rewriting, how to write an identification code into the ROM? Even if a RAM is used, the stored data will disappear upon a power failure. Thus, the cited case simply discloses an identification code rewriting technique. In actual practice, it is not practical.

SUMMARY OF THE INVENTION

The present invention has been accomplished under the circumstances in view. It is the main object of the present invention to provide a blank tire pressure monitoring device and its setup method, which facilitates use and operation and avoids error.

To achieve this and other objects of the present invention, a blank tire pressure monitoring device comprises a housing having an air valve at one end and connection terminals at an opposite end, a circuit board mounted in the housing and carrying a pressure sensor, a temperature sensor, an acceleration sensor, an analog-digital converter electrically connected with the pressure sensor, the temperature sensor and the acceleration sensor, a general purpose I/O terminal unit electrically connected with the connection terminals of the housing; an embedded microcontroller module electrically connected with the general purpose I/O terminal unit and the analog-digital converter and having built therein a flash memory, a microcontroller core and a special-function register controller, a LF receiver electrically connected to the embedded microcontroller module, and a transmitter electrically connected to the embedded microcontroller module.

To achieve this and other objects of the present invention, a blank tire pressure monitoring device setup method is provided for setting up a blank tire pressure monitoring device having a general-purpose I/O terminal unit by: preparing a setup tool having a general-purpose I/O terminal unit and connecting the general purpose I/O terminal unit of the blank tire pressure monitoring device to the general-purpose I/O terminal unit of the setup tool by means of a wired connection method, and then operating the setup tool to select the desired communication program and to transmit the selected communication program to a flash memory of the blank tire pressure monitoring device for enabling the selected communication program to be stored in the blank tire pressure monitoring device, and then separating the setup tool from the blank tire pressure monitoring device for enabling the blank tire pressure monitoring device to be installed in a vehicle tire for application.

BRIEF DESCRIPTION OF THE DRAWINGS

FIG. 7 illustrates a blank tire pressure monitoring device setup method according to an exemplary embodiment of the present invention.

DETAILED DESCRIPTION OF THE INVENTION

Figure 1:
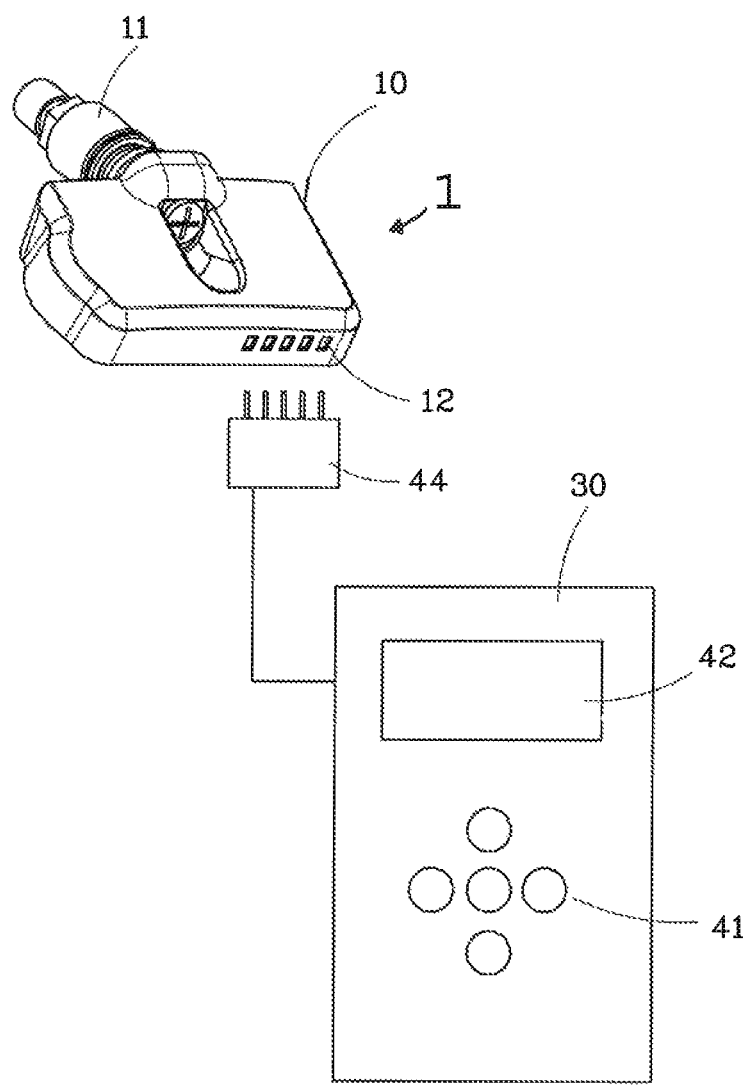
FIG. 1 is a schematic drawing illustrating the relationship between a blank tire pressure monitoring device and a setup tool according to the present invention.
Figure 2:
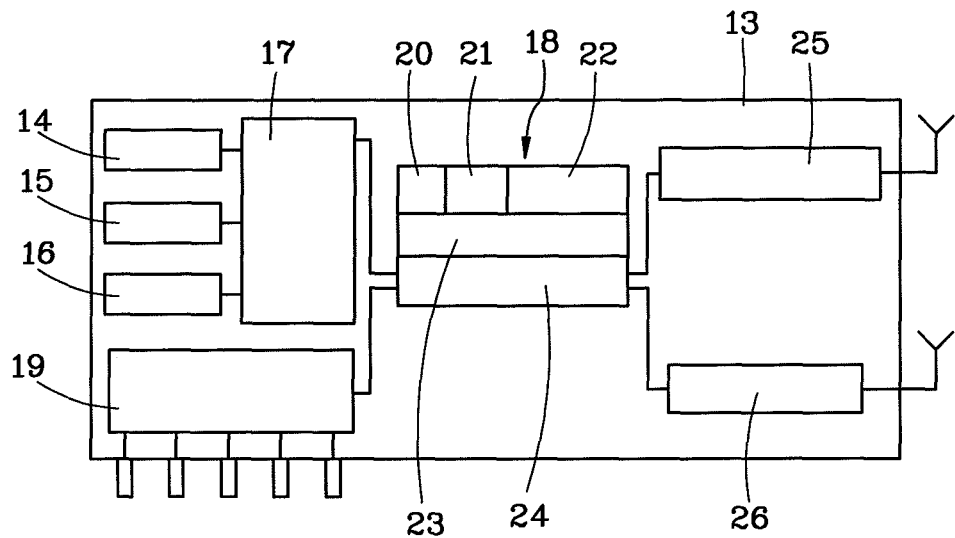
FIG. 2 is a circuit block diagram of a 315 MHz blank tire pressure monitoring device in accordance with a first embodiment of the present invention.

Referring to FIGS. 1 and 2, a blank tire pressure monitoring device 1 in accordance with a first embodiment of the present invention is a 315 MHz blank tire pressure monitoring device, comprising:

a housing 10 having located on one end thereof an air valve 11 and located on an opposite end thereof five connection terminals 12, namely, the power management terminal, the ground terminal, the data program clock terminal, the program data terminal and the detection terminal for frequency differentiating and error prevention control;

a circuit board 13 mounted inside the housing 10;

a pressure sensor 14 installed in the circuit board 13;

a temperature sensor 15 installed in the circuit board 13;

an acceleration sensor 16 installed in the circuit board 13;

an analog-digital converter 17 installed in the circuit board 13 and electrically connected with the pressure sensor 14, the temperature sensor 15 and the acceleration sensor 16;

a general purpose I/O (input/output) terminal unit 19 electrically connected with the five connection terminals 12 of the housing 10;

an embedded microcontroller module 18 electrically connected with the general purpose I/O (input/output) terminal unit 19 and the analog-digital converter 17 and comprising therein a RAM (random access memory) 20, a flash memory 21, a ROM (read only memory) 22, a microcontroller core 23 and a special-function register controller 24;

a LF (low-frequency) receiver 25 electrically connected to the embedded microcontroller module 18;

a 315 MHz transmitter 26 electrically connected to the embedded microcontroller module 18; and a battery (not shown) mounted on the circuit board 13 to provide the blank tire pressure monitoring device with the necessary working power.

Figure 3:
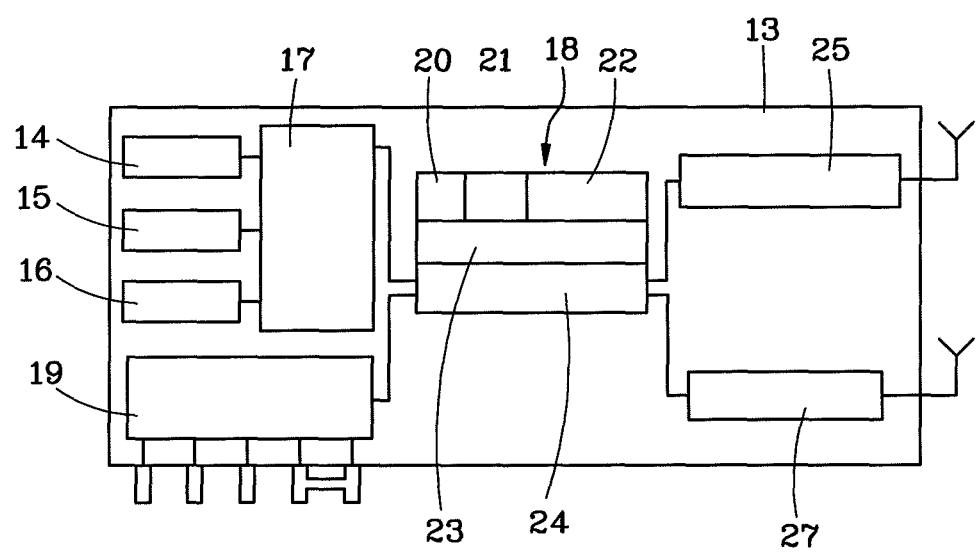
FIG. 3 is a circuit block diagram of a 433 MHz blank tire pressure monitoring device in accordance with a second embodiment of the present invention.

FIG. 3 illustrates a blank tire pressure monitoring device in accordance with a second embodiment. According to this second embodiment, the blank tire pressure monitoring device is a 433 MHz blank tire pressure monitoring device, comprising:

a housing 10 having located on one end thereof an air valve 11 and located on an opposite end thereof five connection terminals 12, namely, the power management terminal, the ground terminal, the data program clock terminal, the program data terminal and the detection terminal for frequency differentiating and error prevention control; further, the detection terminal is electrically conducted with at least one of another four terminals;

a circuit board 13 mounted inside the housing 10;

a pressure sensor 14 installed in the circuit board 13;

a temperature sensor 15 installed in the circuit board 13;

an acceleration sensor 16 installed in the circuit board 13;

an analog-digital converter 17 installed in the circuit board 13 and electrically connected with the pressure sensor 14, the temperature sensor 15 and the acceleration sensor 16;

a general purpose I/O (input/output) terminal unit 19 electrically connected with the five connection terminals 12 of the housing 10;

an embedded microcontroller module 18 electrically connected with the general purpose I/O (input/output) terminal unit 19 and the analog-digital converter 17 and comprising therein a RAM (random access memory) 20, a flash memory 21, a ROM (read only memory) 22, a microcontroller core 23 and a special-function register controller 24;

a LF (low-frequency) receiver 25 electrically connected to the embedded microcontroller module 18;

a 433 MHz transmitter 27 electrically connected to the embedded microcontroller module 18; and a battery (not shown) mounted on the circuit board 13 to provide the blank tire pressure monitoring device with the necessary working power.

Figure 4:
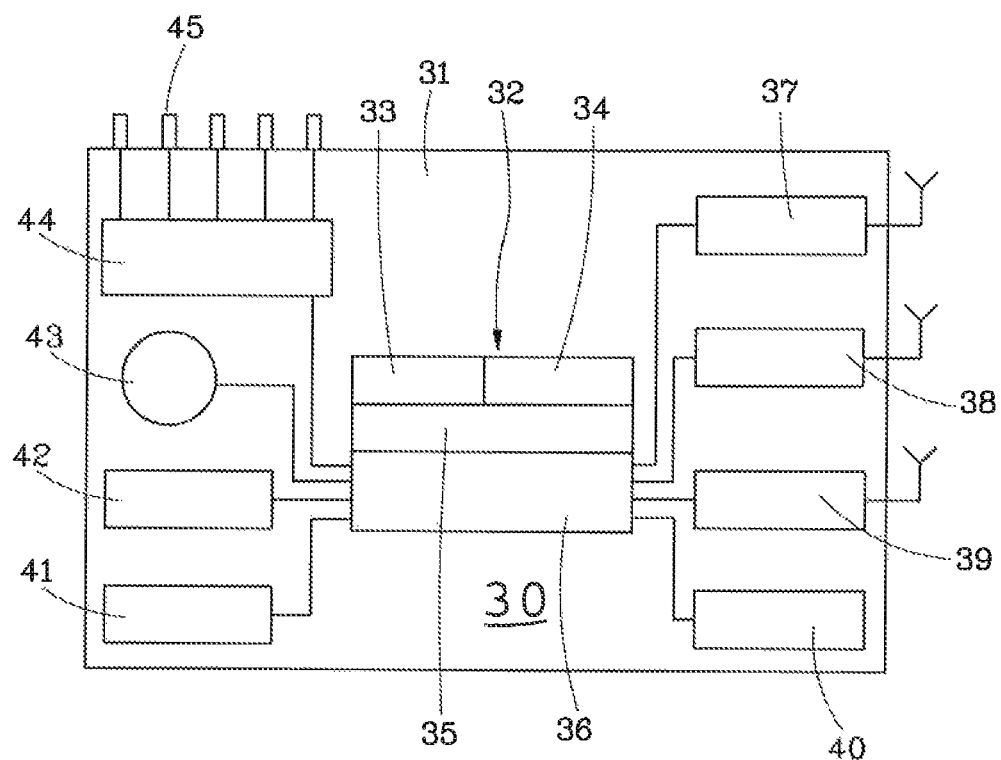
FIG. 4 is a circuit block diagram of the setup tool in accordance with the present invention.

The invention also provides a setup tool 30 for setting up the blank tire pressure monitoring device. As shown in FIG. 4, the setup tool 30 comprises a circuit board 31, an embedded microcontroller module 32, which is installed in the circuit board 31 and comprises a RAM 33, a flash memory 34, a microcontroller core 35 and a special-function register controller 36, and a transmitter 37, a 433 MHz receiver 38, a 315 MHz receiver 39, a USB port 40, a keyboard 41, a display 42, a buzzer 43 and a general-purpose I/O terminal unit 44 respectively electrically connected with the embedded microcontroller module 32. The general-purpose I/O terminal unit 44 comprises five connection terminals 45. The communication programs of different vehicle models can be stored in the setup tool or a computer. Further, the stored communication programs can be updated through the Internet, assuring each stored communication program to be the latest edition.

Figure 5:
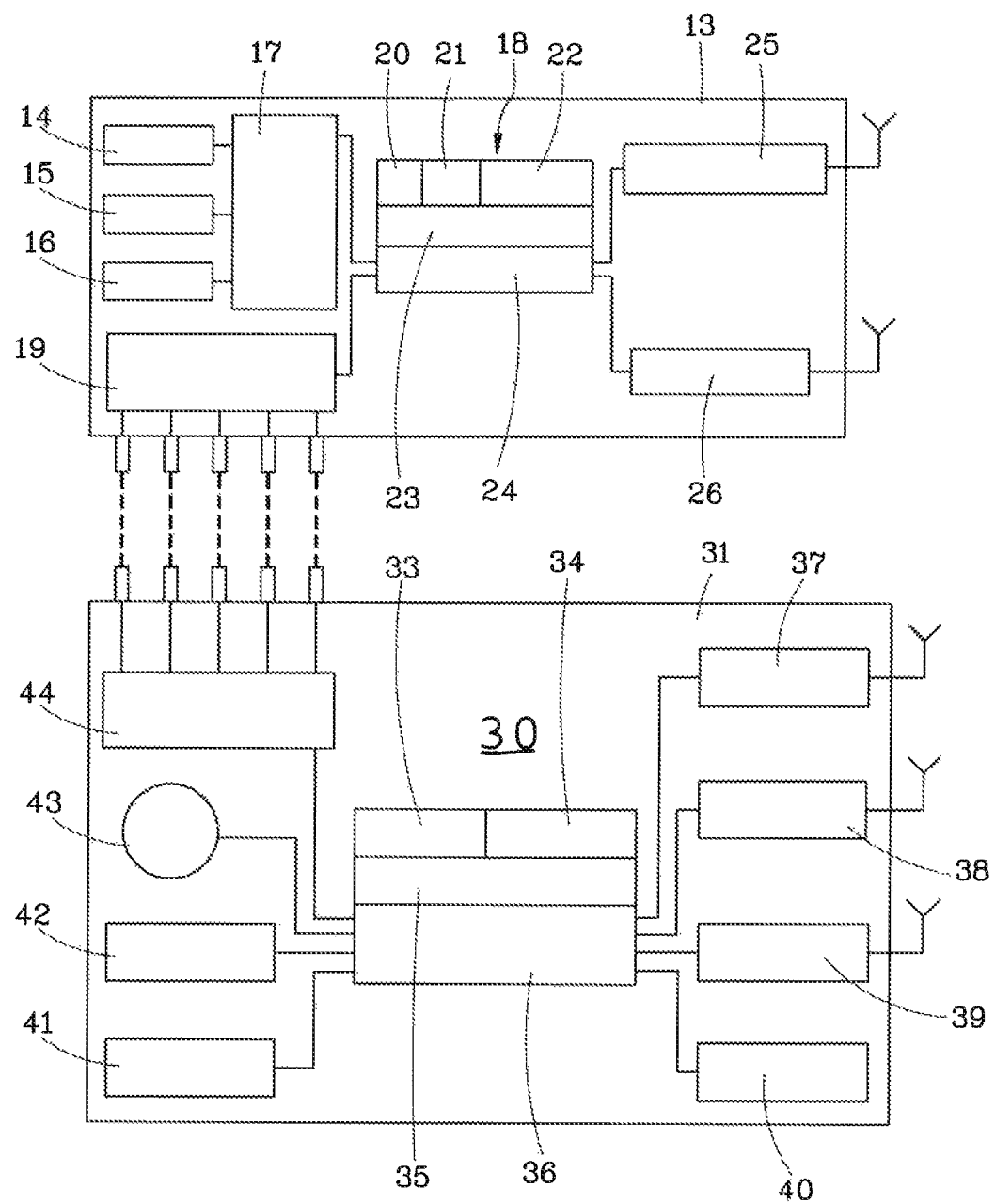
FIG. 5 is a circuit block diagram of the present invention, illustrating the 315 MHz blank tire pressure monitoring device connected to the setup tool.
Figure 6:
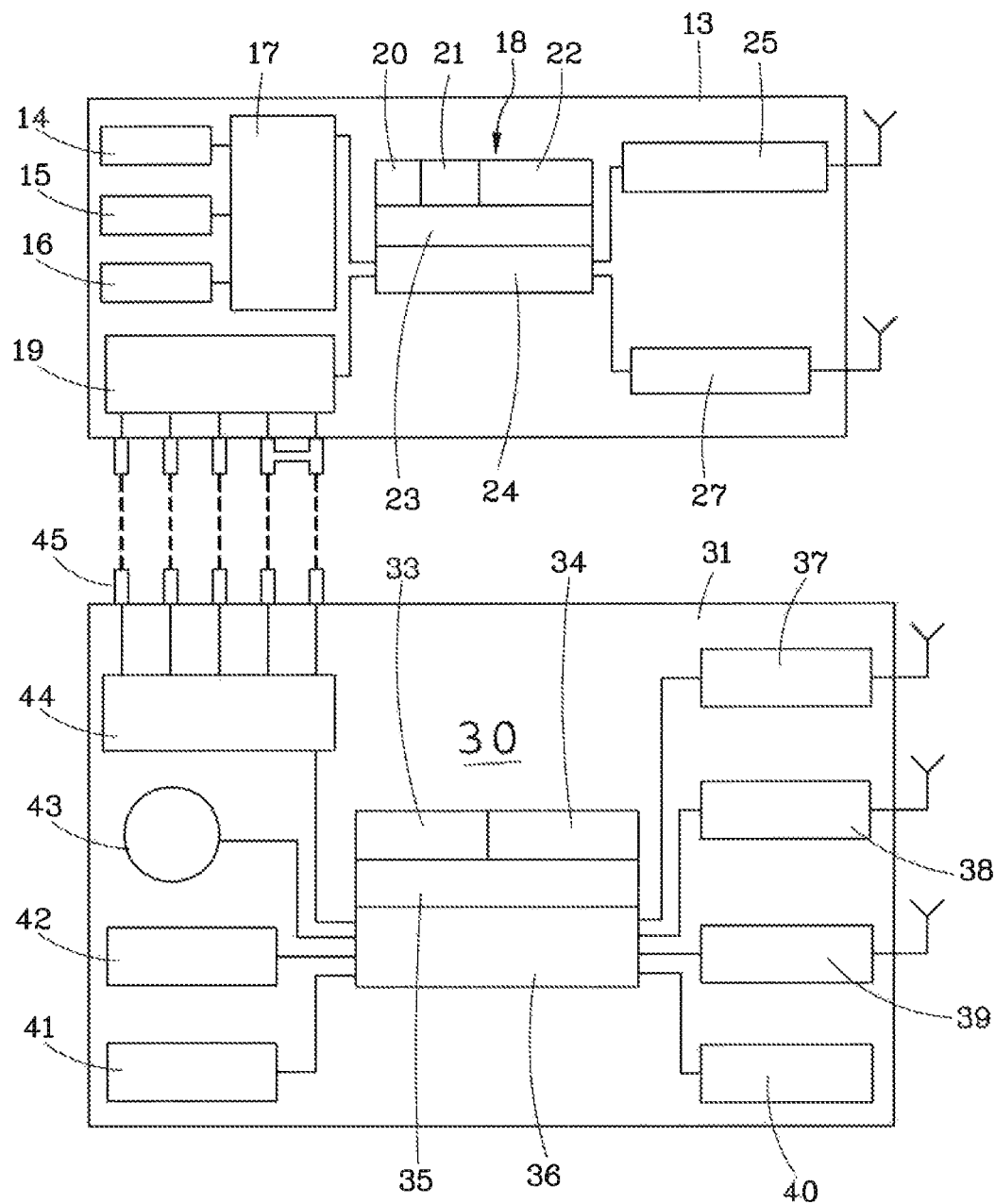
FIG. 6 is a circuit block diagram of the present invention, illustrating the 433 MHz blank tire pressure monitoring device connected to the setup tool.

FIG. 5 illustrates the 315 MHz blank tire pressure monitoring device connected to the setup tool. FIG. 6 illustrates the 433 MHz blank tire pressure monitoring device connected to the setup tool. According to the present invention, the general purpose I/O (input/output) terminal unit 19 of the blank tire pressure monitoring device is connected to the general-purpose I/O terminal unit 44 of the setup tool 30 by means of a wired connection method. After connection between the general purpose I/O (input/output) terminal unit 19 and the general-purpose I/O terminal unit 44, the user can operate the keyboard 41 of the setup tool 30 to select the desired communication program by inputting the data of the car brand, model year and car model, and then transmit the selected communication program to the blank tire pressure monitoring device. The communication program comprises therein a pressure sensor control program, a temperature sensor control program, an acceleration sensor control program, a power supply information control program, a car body receiver RF and LF communication protocol and a pressure and temperature abnormal pre-warning signal protocol. The communication program is stored in the flash memory 20 of the blank tire pressure monitoring device. After download, separate the blank tire pressure monitoring device from the setup tool 30. Thus, the setup of the blank tire pressure monitoring device is done, and the blank tire pressure monitoring device can be installed in the car for application. The ID data can be inputted into the blank tire pressure monitoring device by means of a keyboard.

FIG. 7 illustrates a blank tire pressure monitoring device setup method 700 for setting up a blank tire pressure monitoring device having a general-purpose I/O terminal unit. The method 700 includes preparing 702 a setup tool having a general-purpose I/O terminal unit and connecting the general purpose I/O terminal unit of said blank tire pressure monitoring device to the general-purpose I/O terminal unit of said setup tool by means of a wired connection method, operating 704 said setup tool to select the desired communication program and to transmit the selected communication program to a flash memory of said blank tire pressure monitoring device for enabling the selected communication program to be stored in said blank tire pressure monitoring device, and separating 706 said setup tool from said blank tire pressure monitoring device titer enabling said blank tire pressure monitoring device to be installed in a vehicle tire for application.

In case of a hardware connection error during connection of the blank tire pressure monitoring device for downloading the desired communication program, the setup tool will detect the connection error of the five connection terminal structure, causing the buzzer 43 to buzz. For example, if the 433 MHz blank tire pressure monitoring device is connected to the setup tool and the communication program for 315 MHz blank tire pressure monitoring device is downloaded, the setup tool will detect the error and gives off a warning signal and displays the error message on the display; namely, the setup tool can detect whether the detection terminal of the blank tire pressure monitoring device electrically conducted with at least one of another four terminals of the blank tire pressure monitoring device or not.

The invention has the advantages: the communication program is loaded to the blank tire pressure monitoring device only when the blank tire pressure monitoring device is to be installed in the car; the communication program can be updated through the Internet so that the communication program installed in the blank tire pressure monitoring device is the latest edition, eliminating the problem of questioning the edition of the communication despite the fabrication date of the blank tire pressure monitoring device. Further, the loaded communication program will be stored in the flash memory and will not disappear in case of a power failure or battery replacement. Further, the five connection terminal design can be used for switching between different frequencies as well as for the purpose of pre-warning. This unique advantage is not seen in any prior art designs.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A blank tire pressure monitoring device, comprising:
a housing having located on one end thereof an air valve and located on an opposite end thereof five connection terminals;
a circuit board mounted inside said housing;
a pressure sensor installed in said circuit board;
a temperature sensor installed in said circuit board;
an acceleration sensor installed in said circuit board;
an analog-digital converter installed in said circuit board and electrically connected with said pressure sensor, said temperature sensor and said acceleration sensor;
a general purpose I/O terminal unit electrically connected with said connection terminals of said housing;
an embedded microcontroller module electrically connected with said general purpose I/O terminal unit and said analog-digital converter, said embedded microcontroller module comprising therein a flash memory, a microcontroller core and a special-function register controller;
a LF (low-frequency) receiver electrically connected to said embedded microcontroller module; and
a transmitter electrically connected to said embedded microcontroller module;
wherein said general purpose I/O terminal unit is electrically connected with said five connection terminals of said housing, and
wherein a first connection terminal of the five connection terminals is a power management terminal, a second connection terminal of the five connection terminals is a ground terminal, a third connection terminal of the five connection terminals is a data program clock terminal, a fourth connection terminal of the five connection terminals is a program data terminal, and a fifth connection terminal of the five connection terminals is a detection terminal.

2. The blank tire pressure monitoring device as claimed in claim 1, wherein said detection terminal is electrically connected with at least one of the other four terminals.

3. The blank tire pressure monitoring device as claimed in claim 2, wherein said transmitter is a 433 MHz transmitter.

4. The blank tire pressure monitoring device as claimed in claim 1, wherein said embedded microcontroller module further comprises therein a RAM (random access memory) and a ROM (read only memory).

5. A blank tire pressure monitoring device setup method for setting up a blank tire pressure monitoring device having a general-purpose I/O terminal unit, comprising the steps of:
connecting the general purpose I/O terminal unit of said blank tire pressure monitoring device to a general-purpose I/O terminal unit of a setup tool;
selecting a communication program via the setup tool;
detecting, by the setup tool, at least one error when the selected communication program is not a communication program that is designed for the tire pressure monitoring device hardware; and
when no error is detected, transmitting, via the setup tool, the communication program to a flash memory of said blank tire pressure monitoring device for enabling the communication program to be stored in said blank tire pressure monitoring device; and
separating said setup tool from said blank tire pressure monitoring device,
wherein said blank tire pressure monitoring device has five connection terminals; said general purpose I/O terminal unit of the blank tire pressure monitoring device is electrically connected with the five connection terminals of said blank tire pressure monitoring device;
said five connection terminals of the blank tire pressure monitoring device include a power management terminal, a ground terminal, a data program clock terminal, a program data terminal and a detection terminal for frequency differentiating and error prevention control.

6. The blank tire pressure monitoring device setup method as claimed in claim 5, wherein said communication program comprises therein a pressure sensor control program, a temperature sensor control program, an acceleration sensor control program, a power supply information control program, a car body receiver RF and LF communication protocol and a pressure and temperature abnormal pre-warning signal protocol.

7. The blank tire pressure monitoring device setup method as claimed in claim 5, wherein said blank tire pressure monitoring device comprises an embedded microcontroller module electrically connected with the general purpose I/O terminal unit of said blank tire pressure monitoring device, said embedded microcontroller module comprising therein said flash memory adapted for storing the communication program loaded by said setup tool, a microcontroller core and a special-function register controller.

8. The blank tire pressure monitoring device setup method as claimed in claim 5, wherein said setup tool comprises a circuit board, an embedded microcontroller module installed in said circuit board, said embedded microcontroller module comprising memory, a microcontroller core and a special-function register controller, and a transmitter, a 433 MHz receiver, a 315 MHz receiver, a USB port, a keyboard, a display, a buzzer and a general-purpose I/O terminal unit respectively electrically connected with said embedded microcontroller module.

9. The blank tire pressure monitoring device setup method as claimed in claim 8, wherein the general-purpose I/O terminal unit of said setup tool comprises a power management terminal, a ground terminal, a data program clock terminal, a program data terminal and
a detection terminal for frequency differentiating and error prevention control.

10. The blank tire pressure monitoring device setup method as claimed in claim 5, wherein said detection terminal of the blank tire pressure monitoring device is electrically connected with at least one of another four terminals of the blank tire pressure monitoring device.

11. The blank tire pressure monitoring device as claimed in claim 10, wherein said transmitter is a 433 MHz transmitter.

12. The blank tire pressure monitoring device setup method as claimed in claim 8, wherein said memory of the embedded microcontroller module of the setup tool comprises a RAM (random access memory) and a flash memory.

13. The blank tire pressure monitoring device of claim 1, wherein: the LF (low-frequency) receiver is located in the housing; and the transmitter is located in the housing.

14. The method of claim 5, further comprising: when an error is detected by the setup tool, the setup tool indicates an error by at least one of: displaying an error warning message and making an audible buzz warning sound.

15. The method of claim 14, wherein the error is detected when the blank tire pressure monitoring device's transmitter is a 433 MHz transmitter and the blank tire pressure monitoring communication program is designed for a blank tire pressure monitoring device with a transmitter that is a 315 MHz transmitter.

16. The method of claim 14, wherein the transmitter is a 433 MHz transmitter.

* * * * *